March 14, 1967 J. G. PUTNOCKY, JR 3,309,591
SINGLE PHASE REVOLVING FIELD MOTOR
Filed Nov. 19, 1963 2 Sheets-Sheet 1

INVENTOR.
Joseph G. Putnocky Jr.

March 14, 1967  J. G. PUTNOCKY, JR  3,309,591
SINGLE PHASE REVOLVING FIELD MOTOR
Filed Nov. 19, 1963  2 Sheets-Sheet 2

INVENTOR.
Joseph G. Putnocky Jr.

United States Patent Office 3,309,591
Patented Mar. 14, 1967

3,309,591
SINGLE PHASE REVOLVING FIELD MOTOR
Joseph G. Putnocky, Jr., 189 N. Cedar Road, Fairfield, Conn. 06430; Mary B. Putnocky, administratrix of said Joseph G. Putnocky, Jr., deceased
Filed Nov. 19, 1963, Ser. No. 324,890
3 Claims. (Cl. 318—138)

My invention relates to alternating current powered electric motors.

The object of this invention is to produce in an electric motor, in a set of windings properly connected to a source of single phase alternating power, a rotating magnetic field without the use of mechanical or moving parts.

While it is to be understood that the principles of this invention could be used with a polyphase source of power, in the herein illustrated form of the invention a single phase alternating power will be used with a stator structure and windings which may be considered a modified split phase or capacitor motor.

Figure 1:
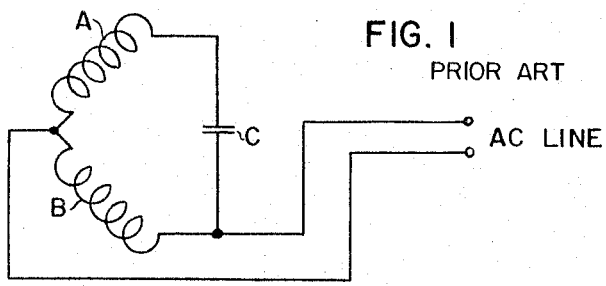
FIGURE 1 shows a simple schematic of a capacitor motor.
Figure 2:
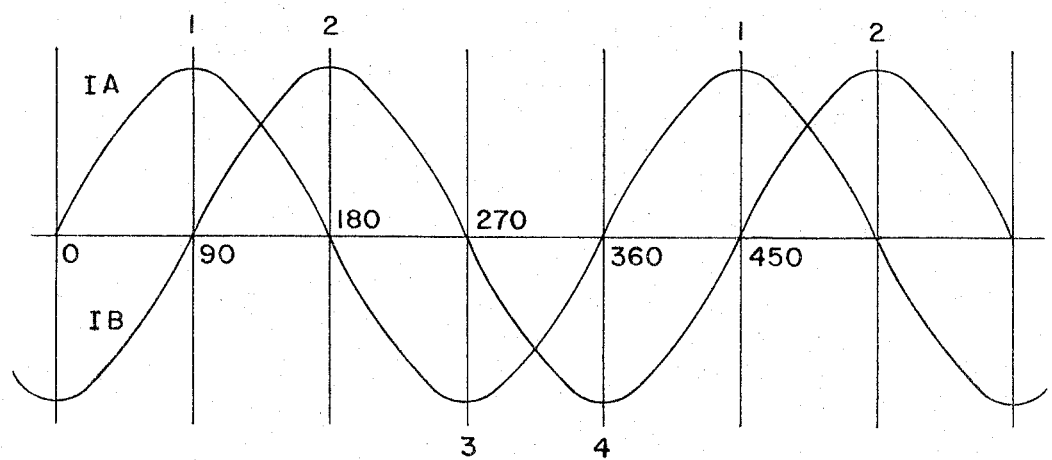
FIG. 2 shows the two sine wave current patterns 90 degrees apart as in the two phase windings of a capacitor motor.

As shown in FIG. 1 the field means comprises field circuits A and B which have winding or coils which are connected in parallel to a source of alternating current voltage. The field circuit A has a capacitor C therein so that the current in the two field circuits will be displaced or out of phase by 90° as is illustrated in FIG. 2.

The field means so arranged will produce the rotating magnetic field so that each will use one alternation or one half cycle of power per winding or coil therein.

Figure 3:
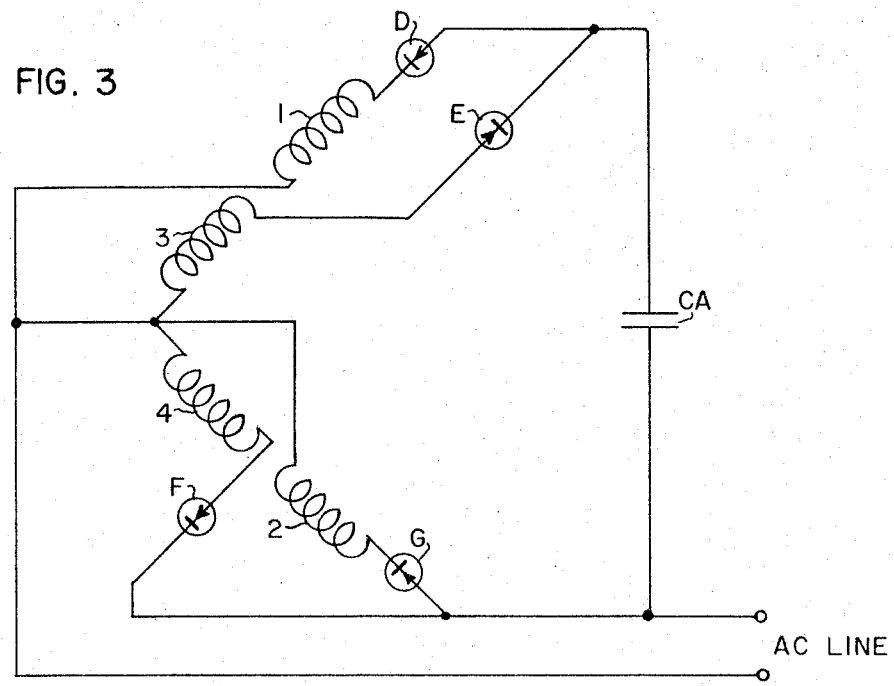
FIG. 3 shows a simple schematic of the invention proper.

However, each of these windings can be broken up into as many multiples as is desired, for example in FIG. 3 windings Nos. 1, 2, 3 and 4 are shown. By being properly mechanically displaced and located in a stator structure, they will produce a revolving magnetic field.

It is self evident that FIG. 1 is a simple schematic of a capacitor motor operating as a two phase motor and that FIG. 3 is a modification of FIG. 1.

It is also evident that windings No. 1 and 3 of FIG. 3 are connected in parallel and comprise one field circuit to operate from the same power phase and may be considered two halves of winding B of FIG. 1 and that windings No. 2 and No. 4 of FIG. 3 are connected in parallel and comprise the other field circuit to operate from the second power phase of this two phase layout and may be considered two halves of winding A of FIG. 1.

Condenser CA in FIG. 3 is the equivalent to phase splitting condenser C in FIG. 1.

The use of one alternation or one half cycle of power per winding is accomplished by the proper application of half wave rectifiers or unidirectional devices so wired and connected into the windings Nos. 1, 2, 3 and 4 as shown in FIG. 3 that current IA as shown in FIG. 2 which in a capacitor motor FIG. 1 would be applied to winding A, however, in the invention in FIG. 3 would be applied to windings 1 and 3 through said rectifiers so connected that alternation No. 1 of current IA in FIG. 2, 0 degrees to 180 degrees would enter coil No. 1 of FIG. 3 only through rectifier D and be blocked out of coil 3 by rectifier E properly connected and then alternation No. 3 of said current IA in FIG. 2, 180 degrees to 360 degrees would next enter coil No. 3 of FIG. 3 only through rectifier E and be blocked out of coil No. 1 by rectifier D.

Current phase IB in FIG. 2 approximately 90 degrees behind current IA with alternation No. 2, 90 degrees to 270 degrees would enter coil No. 2 only in FIG. 3 through rectifier G but be blocked out of coil No. 4 by rectifier F and then alternation No. 4 of said current IB in FIG. 2, 270 degrees to 450 degrees would next enter coil No. 4 of FIG. 3 only through rectifier F and be blocked out of coil No. 2 by rectifier G.

Figure 4:
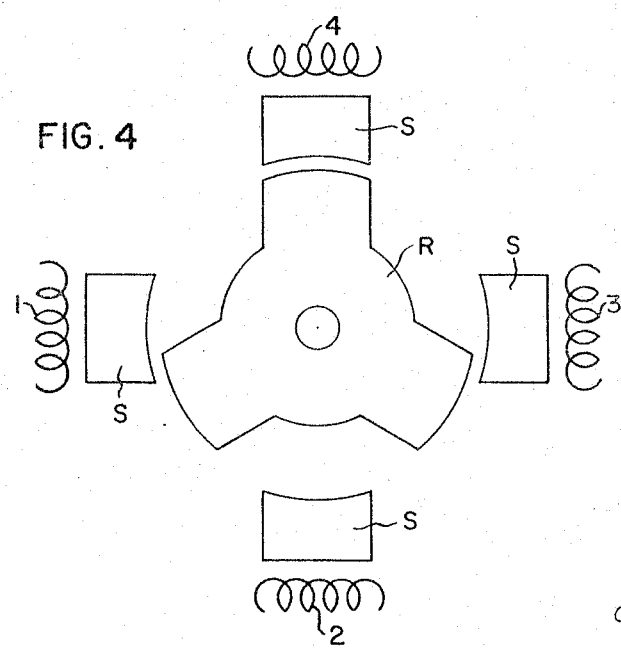
FIG. 4 is a diagrammatic showing of the motor with the field coils arranged in a ring on the stator surrounding the rotor.

As shown in FIG. 4, coils No. 1 and No. 3 and No. 2 and No. 4 are mechanically displaced on the stator by 180° and are arranged on the stator S in a circle or ring around the armature R, with the coils disposed in an alternating sequence 90° apart. When these coils are connected to the alternating currents IA and IB of FIG. 2 which are approximately 90 degrees out of phase and the current fed into said windings Nos. 1, 2, 3 and 4 through rectifiers or unidirectional devices D, E, F, and G, a rotating magnetic field will result without the use of mechanical or moving parts.

Figure 5:
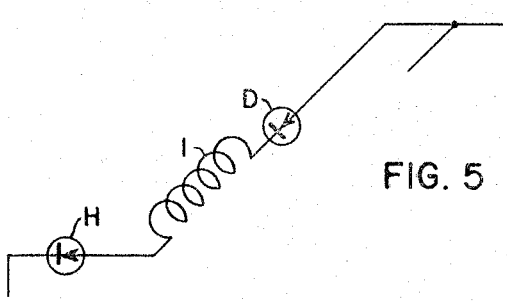
FIG. 5 is a fragmentary view showing a modified rectifier means.

Depending on design factors, voltage, frequency, current, inductance and capacitance of coil windings Nos. 1, 2, 3 and 4, it may be necessary to have two rectifiers on each coil winding, one on each end. As shown in FIG. 5, a rectifier H is connected to the second end of coil No. 1 and the other coils can be similarly provided with a second rectifier.

While I have shown and described one embodiment of my invention, it will be understood that it is not to be limited to all of the details shown, but is capable of modification and variation within the spirit of the invention and scope of the appended claims.

What I claim as my invention is:

1. In an electric motor having a stator, a rotor, and field means for causing rotation thereof, said field means comprising a plurality of field circuits connected in parallel with a source of alternating current power with one of said circuits having a capacitor therein whereby the current in said circuits is out of phase electrically, each field circuit comprising a plurality of field coils with the coils in said circuits being connected in parallel and alternately arranged and mechanically displaced on the stator in a ring surrounding the rotor, and individual rectifier means serially connected to each coil and so poled as to render said coil operative during one half of each cycle of the alternating current in said field circuits to thereby produce a rotating magnetic field for the motor.

2. The invention as defined in claim 1 wherein the rectifier means comprises a unidirectional control at each end of each coil operative to restrict energizing current in each coil to a predetermined portion of said alternating current.

3. In an electric motor having a stator, a rotor, and field means for causing rotation thereof, said field means comprising a plurality of field circuits connected in parallel with a source of single phase alternating current with one of said circuits having a capacitor therein whereby the current in said circuits is 90° out of phase electrically, each field circuit comprising a pair of oppositely disposed field coils with the coils in said circuits bein galternately located and mechanically displaced by 90° on the stator in a ring surrounding the rotor, and an individual unidirectional device serially connected to each coil and so poled as to render said coil operative during one half of each cycle of the alternating current to produce a rotating magnetic field for the motor.

References Cited by the Examiner

UNITED STATES PATENTS

| | | | |
|---|---|---|---|
| 1,707,423 | 4/1929 | Bailey | 318—221 |
| 3,089,992 | 5/1963 | Seney | 318—171 |

FOREIGN PATENTS

| | | |
|---|---|---|
| 1,077,887 | 5/1954 | France. |
| 396,885 | 8/1933 | Great Britain. |
| 725,802 | 3/1955 | Great Britain. |

ORIS L. RADER, *Primary Examiner.*

G. Z. RUBINSON, *Assistant Examiner.*